April 17, 1962 M. G. COMUNTZIS 3,030,553

RUGGEDIZED ELECTRONIC PACKAGING

Filed Dec. 29, 1958 2 Sheets-Sheet 1

INVENTOR.
Marcus G. Comuntzis
BY
S. J. Rotondi, A. J. Dupont & E. R. Mackert

April 17, 1962 M. G. COMUNTZIS 3,030,553

RUGGEDIZED ELECTRONIC PACKAGING

Filed Dec. 29, 1958 2 Sheets-Sheet 2

INVENTOR.
Marcus G. Comuntzis
BY

S. J. Rotondi, A. J. Dupont & E. R. Mackert 3,030,553

RUGGEDIZED ELECTRONIC PACKAGING

Marcus G. Comuntzis, Pasadena, Calif., assignor to the United States of America as represented by the Secretary of the Army Filed Dec. 29, 1958, Ser. No. 783,627
6 Claims. (Cl. 317—100)

This invention relates to electronic packaging and particularly to the packaging of electronic components which will be subject to vibrations over a very wide range of frequencies.

The conventional approach to any vibration problem in electronic assemblies is to shock mount components which are subject to vibration. However, the use of shock mounts is restricted by the type of environment. Shock mounts for fixed frequency or narrow frequency range environment offer immediate solutions to the vibration problems. However, in general, vibration environments possessing energies over a wide frequency range which includes low frequencies eliminate shock mounts as vibration isolators. The reason for this lies in the fact that a shock mounted system has a resonant frequency which amplifies when excited at its resonant frequency. Proper mechanical design and the application of certain techniques which are within the scope of this invention insure that the resonant frequencies of the main structure and component part mountings are well above the highest frequency to be encountered in a specific application.

The present invention provides an annular ring which forms the chassis for electronic components such as tubes. The annular ring is provided with either longitudinal or radial holes to mount the tubes which may be cemented in the holes or mounted by means of polygonal springs. In the latter case space is provided around the tubes through which a cooling medium may be passed. Secured to the annular chassis is a terminal board which takes the form of a cylindrical or disk-like element bonded to the chassis and is utilized to mount the smaller components and circuitry.

An object of the invention is to provide an electronic assembly which is resistant to shock and vibration.

Another object is to provide an electronic assembly which is lighter and more compact than those in use.

A further object of the invention is to provide an electronic package which enables cooling of components which would otherwise cause excessive local heating.

Another object of the invention is to provide an electronic package which may be stacked with other like electronic packages to form a compact unit.

Still another object of the invention is to provide an electronic package having a chassis which provides electrical shielding.

Figure 1:
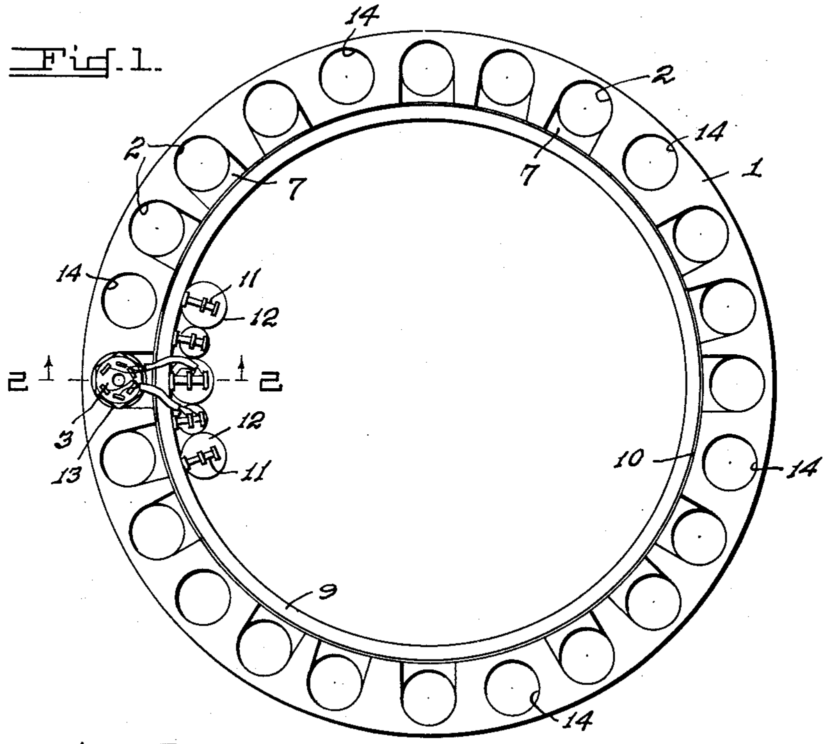
Figure 2:
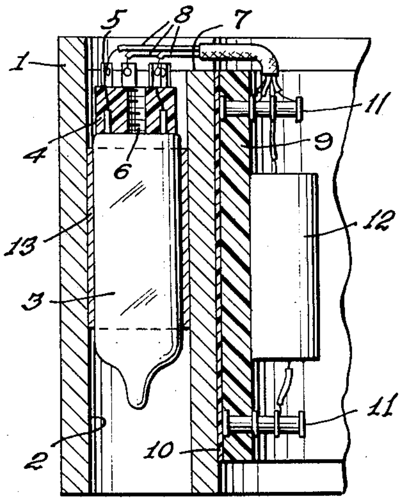
Figure 3:
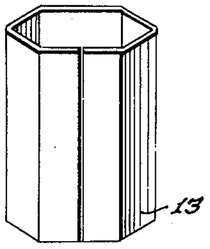
Figure 4:
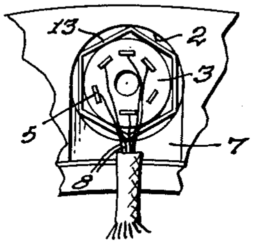
Figures 5, 6, 7:
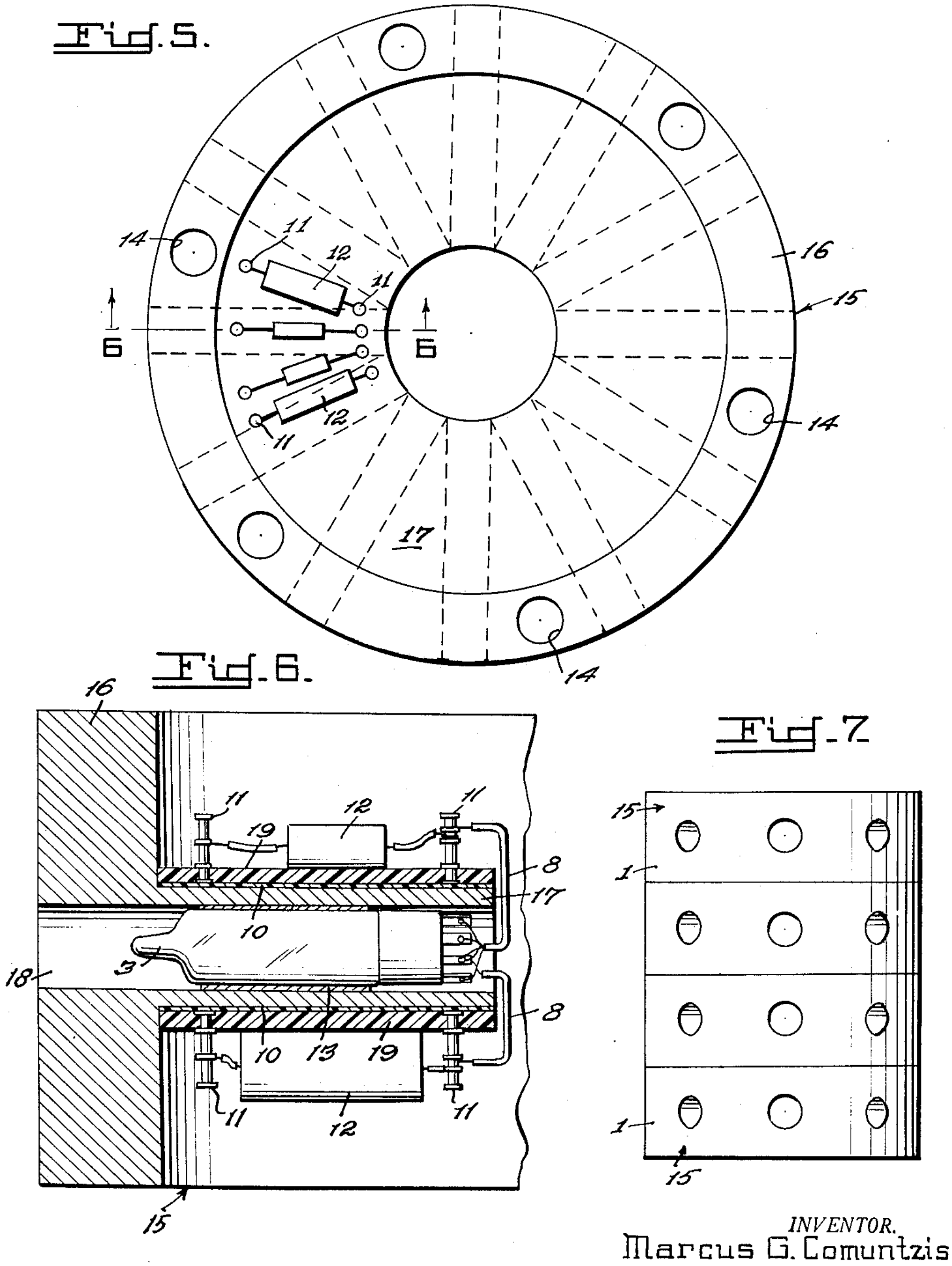

These and other objects will become more apparent when reference is had to the following detailed description and drawings, in which:

FIGURE 1 is a plan view of one form of electronic package according to the present invention, FIGURE 2 is an enlarged sectional view taken on the line 2—2 of FIGURE 1, FIGURE 3 is a perspective view of a tube mounting spring, FIGURE 4 is an enlarged detailed view showing the mounting of one of the tubes in the chassis, FIGURE 5 is a plan view of a modified form of electronic package, FIGURE 6 is an enlarged sectional view taken on the line 6—6 of FIGURE 5, and FIGURE 7 shows the manner in which the package units may be stacked to form a compact unit.

Referring in detail to the drawings and particularly to the embodiment illustrated in FIGURES 1–4, there is shown an annular chassis which may be made of magnesium or aluminum and suitably plated to improve its electrical properties. The chassis may be cast or machined and is provided with a plurality of longitudinal passageways or holes 2 therethrough to receive electrical components such as tubes, capacitors, resistors or the like. In FIGURE 1 only one such component is shown assembled in the chassis for ease of illustration. This component is more clearly shown in the enlarged view of FIGURE 2 and is illustrated as a tube 3 having dielectric base 4 and pins 5. The base 4 has the central threaded aperture 6 which may receive a tool to remove the tube from the socket. It will be noted that the longitudinal dimension of the chassis is greater than the tube or other components to be mounted therein so as not to have any parts extended beyond the end faces thereof. The chassis is also provided with cut away slots 7 between the component mounting holes 2 and the interior of the chassis so that lead wires such as 8 from the tube 3 can be led through without extending beyond the end face of the chassis.

A cylindrical terminal board of dielectric material is indicated at 9 and is bonded to the chassis 1 through the medium of insulating strip 10. The terminal board carries the mounting pins 11 and a number of smaller components 12 connected into the circuitry by the medium of the pins 11. These smaller components, such as resistors or capacitors, will be mounted around the entire terminal board, but for sake of clarity only a few have been shown in FIGURE 1.

The larger components such as the tube 3 are mounted in the holes 2 in the chassis in a manner shown in FIGURES 2 and 4. A polygonal spring 13 which has substantial axial extent is mounted in each hole 2 in the chassis. Such a spring is shown in perspective in FIGURE 3. The tube 3 is inserted in and tightly engages the spring so as to be firmly held in the chassis hole 2. With this manner of mounting the tubes it will be seen that good heat transfer into the chassis is obtained and sufficient space is present between the tubes and chassis to allow circulations of a cooling gas. With the tubes mounted completely within the chassis, the chassis also acts as an electrical shield.

The chassis thus far described may be used with a plurality of other like chassis in stacked relation as illustrated in FIGURE 7. Each chassis is provided with a number of through holes 14 which will be aligned when the units are stacked to receive connectors and through cables.

As an alternative to the spring means for mounting the tube 3 in the chassis hole 2 the tube may be cemented in the hole. This provides for better heat transfer contact of the tube with the chassis, but precludes the circulation of a coolant through the hole.

An alternative embodiment of the invention is shown in FIGURES 5 and 6 of the drawings. Parts in this embodiment which find direct counterparts in the embodiment of FIGURES 1–4 have been given the same reference characters. In this form the annular chassis 15 is formed with a relatively thick peripheral flange 16 and an integral radial web 17. The web 17 is provided with a plurality of radial holes 18 which extend outwardly through the flange 16 for the reception of tubes 3. A pair of disk-like terminal boards 19 are bonded to the web 17 with the intermediate insulating sheets 10. The chassis flange 16 is provided with a plurality of apertures 14 so that the units may be connected in stacked relation as shown in FIGURE 7. The tubes 3 and smaller components 12 are mounted in the same manner as these components are mounted in the species of FIGURES 1–4.

The electronic packages of the present invention are well adapted for use on missiles or the like where very high acceleration forces are encountered. The tubes and larger components are encased within the passageways of the chassis and can better withstand the forces of acceleration. Depending on how the package is to be mounted with respect to the direction of acceleration forces, the package of FIGURES 1–4 or FIGURES 5 and 6 is chosen. For better results the tubes should be mounted parallel to the direction of acceleration forces.

The electronic packages shown and described have been tested over a vibration range of 20 to 1000 cycles at an intensity of 24 to 30 g with no failures. Because of the lack of standard shock mountings no resonant vibrations were encountered.

It will be apparent that the embodiments shown are only exemplary and that various modifications can be made without departing from the scope of this invention as defined in the appended claims.

I claim:

1. An electronic package comprising an annular chassis forming an electrical shield for all parts contained therein said chassis having end faces and a plurality of passageways extending therethrough, major electrical components mounted in said passageways, the axial extent of said passageways being greater than the axial extent of said components, a terminal board connected to the interior surface of said chassis, minor electrical components mounted on said terminal board and electrical connections between said major and minor components, said chassis and its mountings adapted to have a resonant frequency higher than a frequency range of 20 to 1000 cycles.

2. An electronic package as defined in claim 1 in which said chassis is formed with a peripheral flange and an integral inwardly extending radial web.

3. An electronic package as defined in claim 2 in which said passageways extend radially through said peripheral flange and radial web.

4. An electronic package comprising a plurality of components connected together in abutting stacked relationship forming an electrical shield for all parts contained therein, each component comprising an annular chassis having a plurality of passageways extending therethrough, major electrical components mounted in said passageways, the axial extent of said passageways being greater than the axial extent of said electrical components, a terminal board connected to said chassis, minor electrical components mounted on said terminal board and electrical connections between said major and minor components, said chassis and its mountings adapted to have a resonant frequency higher than a frequency range of 20 to 1000 cycles.

5. An electronic package comprising a chassis for mounting electrical components, said chassis being annular and having a plurality of axial passageways therethrough, a split polygonal spring sleeve mounted in each passageway, a major electrical component mounted within each of said polygonal springs, a terminal board secured to the inner cylindrical surface of said annular chassis, minor electrical components mounted on said terminal board and connected electrically to said major components, a dielectric lining between the terminal board and said inner cylindrical surface adapted to provide an electronic shield between the major and minor components.

6. An electronic package comprising a chassis for mounting electrical components, said chassis being a hollow cylinder and having a plurality of radial open-end passageways in the periphery greater in depth than the length of said components, a split polygonal spring sleeve mounted in each passageway, a major electrical component mounted within each of said polygonal springs, a terminal board secured to both the top and bottom of said radial passageway within the cylindrical chassis, minor electrical components mounted on said terminal boards and connected electrically to said major components, a dielectric lining between said terminal boards and said radial passageways adapted to provide an electronic shield between the major and minor components.

References Cited in the file of this patent

UNITED STATES PATENTS

| | | |
|---|---|---|
| 2,555,039 | Bissonette | May 29, 1951 |
| 2,633,526 | Snyder | Mar. 31, 1953 |
| 2,836,772 | Wintrode | May 27, 1958 |
| 2,876,277 | Badger | Mar. 3, 1959 |
| 2,881,364 | Demer | Apr. 7, 1959 |
| 2,934,814 | Williams | May 3, 1960 |